July 11, 1950            E. A. DEMPSEY            2,514,695
VEHICLE BODY AND ATTACHMENT THEREFOR
Filed Dec. 31, 1948                                        3 Sheets-Sheet 1
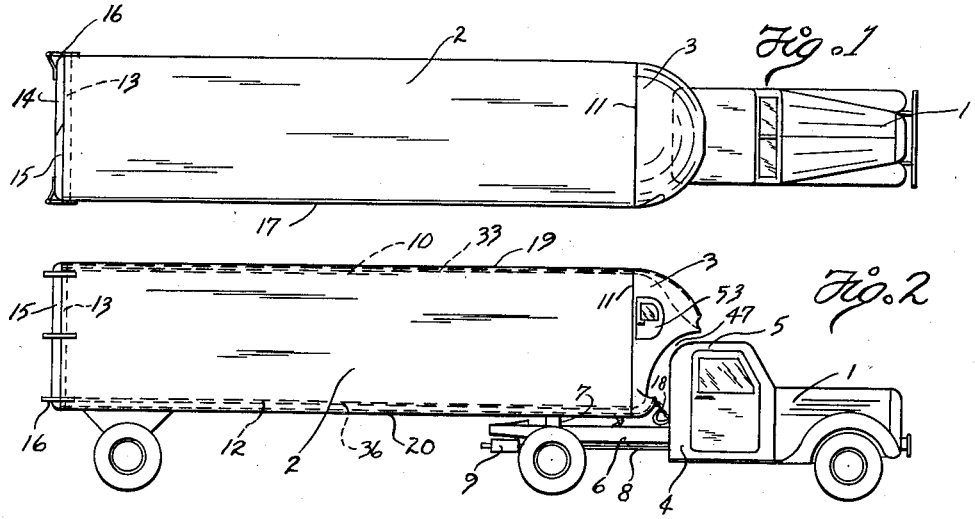
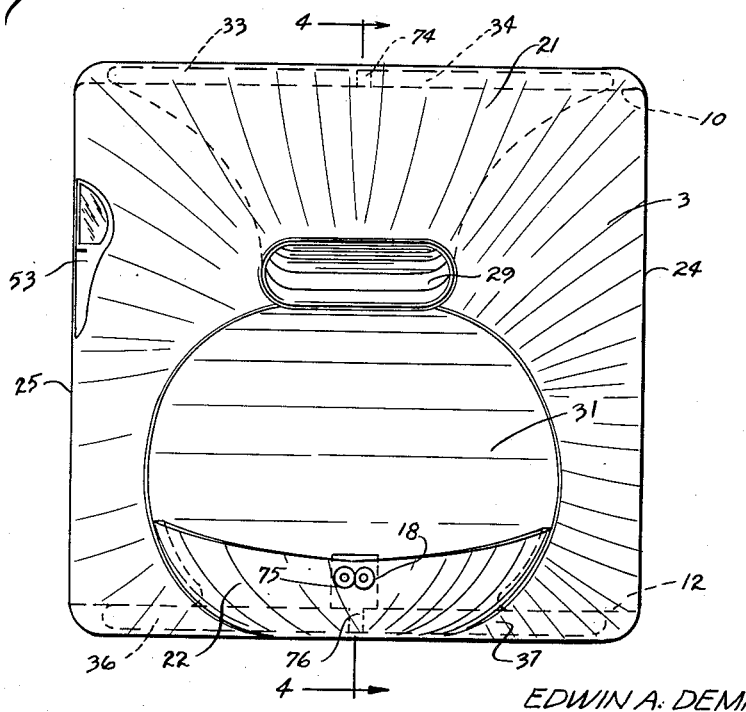
EDWIN A. DEMPSEY
INVENTOR.
BY Beale and Jones.
ATTORNEYS

EDWIN A. DEMPSEY
INVENTOR.

BY Beale and Jones.

ATTORNEYS

July 11, 1950   E. A. DEMPSEY   2,514,695
VEHICLE BODY AND ATTACHMENT THEREFOR
Filed Dec. 31, 1948   3 Sheets-Sheet 3
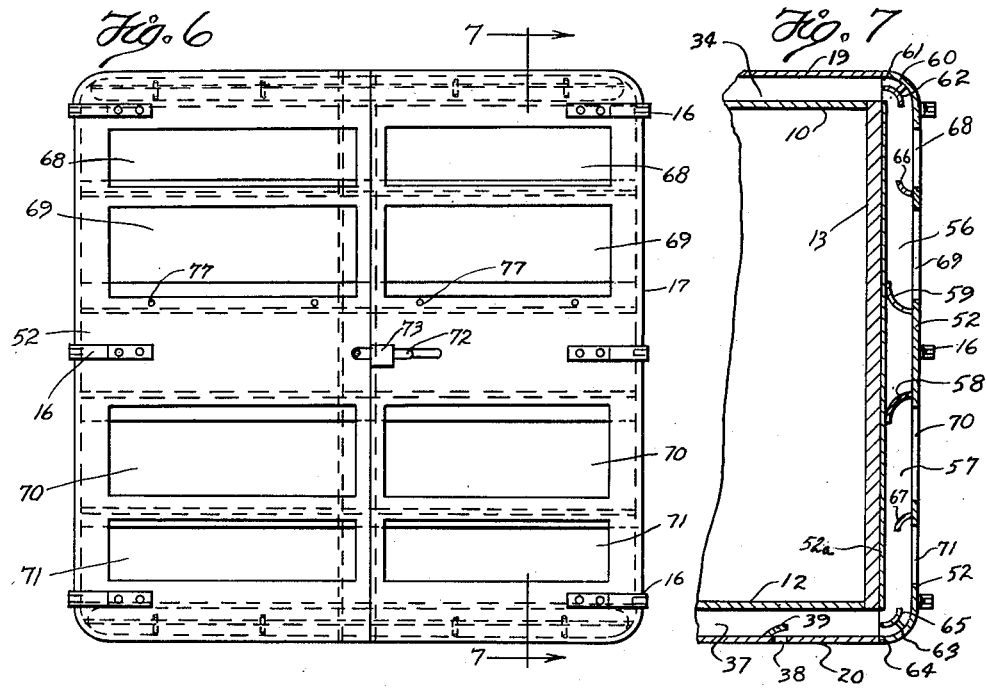
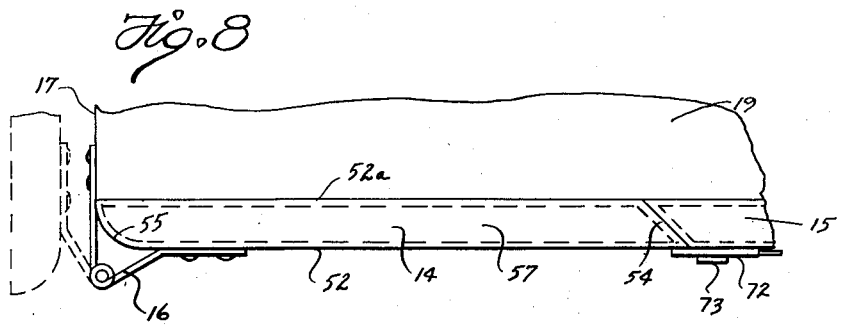
EDWIN A. DEMPSEY
INVENTOR.
BY Beale and Jones
ATTORNEYS Patented July 11, 1950

2,514,695

UNITED STATES PATENT OFFICE 2,514,695

VEHICLE BODY AND ATTACHMENT
THEREFOR

Edwin A. Dempsey, Baltimore, Md.

Application December 31, 1948, Serial No. 68,657

6 Claims. (Cl. 296—28)

This invention relates to vehicle bodies and more particularly to vehicle bodies which are not self-propelled. Such vehicle bodies are frequently known as semi-trailers which are adapted for attachment to and movement by tractor units.

In the construction of semi-trailer vehicle bodies, certain considerations are of much importance. The body must be constructed of materials which provide sufficient strength to enable the vehicle to be used for hauling heavy loads. The vehicle must be large enough to provide a load-carrying capacity which, in turn, will insure a payload of maximum size. At the same time, the outer dimensions of the body, as to width, length, and height, are limited not only by local laws but by the dimensions of highways, curves on the highways and the clearances of overhead bridges or tunnels through which the vehicle may pass. Consequently, I have observed that most semi-trailer bodies in use in the past, have been constructed so as to avoid exceeding the maximum legal allowable width, height, and length while at the same time providing the maximum interior load-carrying space. For the most part, these objects have been achieved by the construction of a semi-trailer body which is shaped not unlike an elongated rectangular box having a vertical rectangular front wall, elongated vertical rectangular side walls, a rectangular flat floor and a corresponding rectangular flat roof. The tail, or the rear-end of the vehicle is generally provided with access doors which may be hinged at the sides so as to provide doors which swing outwardly around a vertical axis or which may be hinged at the top and bottom so as to provide gates which swing on horizontal axes. Such vehicles are generally provided, adjacent their rear-end, with ground wheels mounted on suitable spring suspensions. Some such vehicles may additionally be provided with a set of front ground wheels such as illustrated in the body construction shown in U. S. Patent 2,384,965. Another type of semi-trailer frequently seen is provided with a retractable wheel support such as is illustrated in U. S. Patent 2,303,580. All such prior art vehicles rely upon a detachable source of motive power. Such a detachable source of motive power is generally in the form of a tractor the essential features of which are, of course, an internal combustion engine, or a Diesel engine, mounted on a suitable chassis. There is also usually mounted a cab similar to an automobile or truck cab and utilized by the driver of the tractor. Behind the cab the chassis of the tractor is generally extended, sufficiently rearwardly to provide a coupling base for attachment to the front end of the semi-trailer. The size of the semi-trailer and the weight thereof, particularly when carrying a full payload, necessitates a powerful tractive force, capable of moving the semi-trailer over highways under a great variety of conditions. The tractor must be capable of starting from a dead standstill; must be capable of pulling the semi-trailer up steep grades; and must be capable of pulling the semi-trailer over wet, icy, snow-covered, or rough highway surfaces. More importantly, from the viewpoint of maximum payloads and maximum efficiency of operation, the tractor must be capable of moving the semi-trailer at high speeds on the open highway. To permit the accomplishment of all of these objects, the tractor is conventionally provided with a plurality of gear ratios, capable of moving the trailer at a wide range of speeds forwardly and, to a less extent, rearwardly. The manipulation of a tractor of this type requires great personal skill on the part of the driver and more or less constant attention on the part of the driver. Generally each driver is accompanied by an assistant or alternate, and consequently, the cab utilized on the tractor is large enough to shelter two persons.

However, it will be observed that notwithstanding the power and relative size of the tractor used in load carrying semi-trailers, the tractor itself is considerably smaller with regard to height and width than is the semi-trailer. Consequently, as viewed from the front, the front wall of the semi-trailer presents extensive marginal areas, above and at the sides of the tractor cab, which are exposed to the largely unbroken air forces which resist forward movement of its vehicle. Moreover the space immediately behind the cab and in front of the semi-trailer front wall is exposed to variable air forces created by great turbulence. Power losses, uneconomical fuel consumption and irregular movement of the semi-trailer, such as swaying or whiplashing are caused by these air forces and turbulence. This circumstance is of importance in the invention hereinafter described.

I have observed that, as above stated, while considerable thought and engineering skill have been expended in the design of a semi-trailer for the purpose of insuring its ability to carry a maximum payload, little or no attention has been directed toward the design of semi-trailer bodies which will lessen or eliminate power loss and other disadvantages resulting from wind resistance. I am aware that some semi-trailer bodies have been constructed with a somewhat rounded front wall as contrasted from the usual perfectly flat front end. Such a rounded front end on a semi-trailer does, to a limited extent, lessen the wind resistance in the immediate front end of the vehicle. However, it is important to note that this accomplishment is achieved at the expense of valuable interior loading space and thus reduces the payload of the vehicle. It is obviously impossible to load compactly or efficiently, rectangular or odd shaped packages or objects in a space which is bounded by the arc of a circle. Consequently, the rounded front end semi-trailer can only be built by sacrificing valuable load carrying space or by extending the vehicle to a length which may run contrary to legally permissible body lengths.

My invention has for one of its objects the provision of an extension, or "blister," on the front end of a semi-trailer body which is essentially otherwise of standard length, width, height, and load carrying capacity. A further object is the provision of such a blister installed in a manner which will not hamper the free turning movement of the tractor or any part thereof, particularly the cab, yet at the same time will serve to streamline the front end of the semi-trailer and greatly lessen the wind resistance at that portion of the vehicle. Additionally, my invention has for an object the collection of air, which might otherwise create undesired turbulence adjacent the front end of the vehicle, the transmission of such collected air toward the rear of the vehicle, and the discharge of the so collected air at a number of places, more or less uniformly disposed over the rear end of the vehicle so as to lessen, if not destroy, the condition of partial vacuum which always exists in the wake of a solid body traveling through a fluid medium. A still further object of my invention is the provision of a blister adjacent the front end of a semi-trailer in such a manner as to leave unmodified the essential load carrying capacity of the vehicle while at the same time providing useful space within the vehicle for the provision of sleeping quarters for a vehicle operator, or the housing of refrigerating-compression units or the like. Further objects will be apparent from the following description.

In the drawings like reference numbers refer to like or similar elements.

Figure 1 is a top plan view of a tractor and semi-trailer modified in accordance with this invention;

Figure 2 is a side plan view of a tractor and semi-trailer modified in accordance with this invention;

Figure 3 is a front elevation of a semi-trailer modified in accordance with this invention;

Figure 6 is the rear-end elevation of the auxiliary rear doors which form one element of this invention;

Figure 7 is a fragmentary detail of the rear-end of the semi-trailer, in cross-esection, taken along the line 7—7 of Figure 6; and Figure 8 is a detail top plan view of a portion of the rear end of the semi-trailer with the auxiliary door in closed position and showing the position assumed by the auxiliary door in broken dotted lines.

Figure 4:
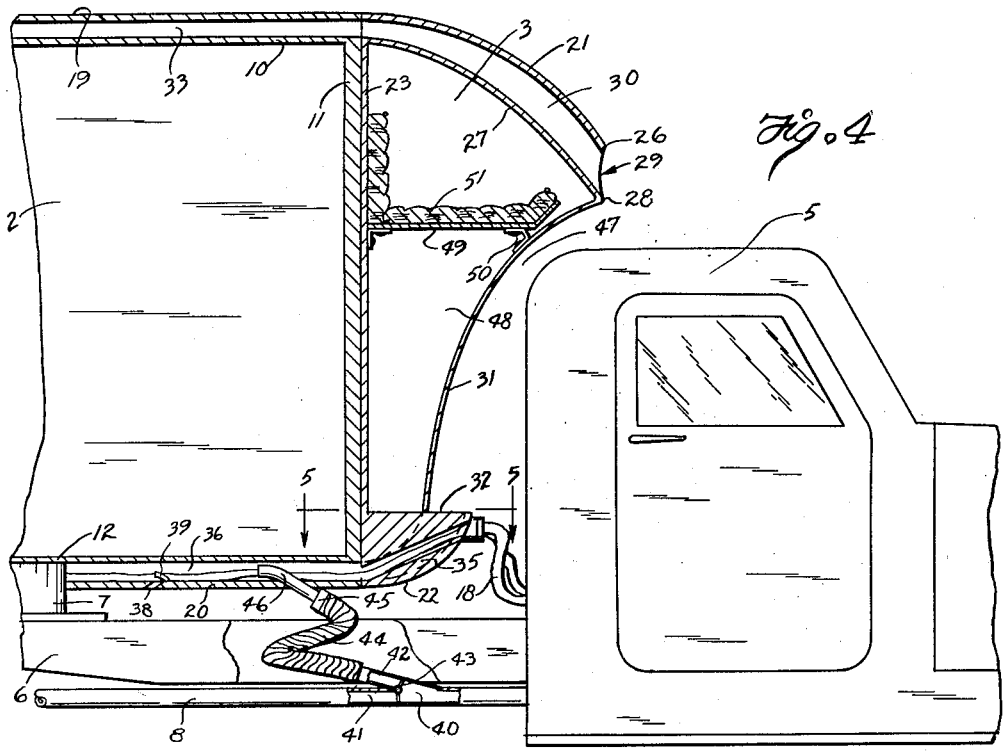
Figure 4 is a detailed side elevational view showing the tractor cab, also showing, in cross-section, as taken along the line 4—4 of Figure 3 the front end of the semi-trailer modified in accordance with this invention.

Turning now to Figure 1, 1 represents generally the tractor, 2 represents generally the semi-trailer body, or that portion which is conventional when unmodified by this invention, and 3 represents generally the blister or front end extension which comprises an important part of this invention. The tractor 1 is provided with a cab 4 surmounted by a roof 5. The chassis 6 of the tractor is provided with a coupling mounted on pedestal 7 which supports the front end of the semi-trailer 2. Conveniently, and conventionally mounted adjacent the chassis is an exhaust line 8 terminating in a muffler 9 which, under normal operation with an internal combustion engine, discharges and muffles the exhaust gases from the engine. The semi-trailer body 2 has its conventional roof 10, conventional flattened front wall 11, conventional floor 12, and conventional doors 13 at the rear-end of the body. Mounted exteriorly and rearwardly of the conventional doors are a pair of auxiliary doors 14 and 15 suitably supported by hinges 16. Desirably hinges 16 will be of such a type as to be mounted on side walls 17 of the semi-trailer in a manner which will permit auxiliary doors 14 and 15 to be opened and moved entirely clear of the rear end of the semi-trailer so as to expose the conventional doors 13. Such movement is shown in detail in Figure 8 of the drawings.

It will be understood that side walls 17 of the semi-trailer are entirely unmodified. However, an auxiliary floor 20 and preferably also an auxiliary roof 19 are provided below and above, respectively, the conventional floor 12 and the conventional roof 10 of the semi-trailer. While the addition of the auxiliary floor 20 presents no particular problems other than the usual mechanical arrangement necessary to accommodate such elements as spring mountings and the coupling 7, the addition of the auxiliary roof 19 does present some problem. In modifying an existing semi-trailer by the addition of the auxiliary roof, in some cases it may be found that the conventional roof 10 of the particular semi-trailer is so close to the maximum legal permissible height for such a vehicle that an additional structure superimposed thereon will cause the total vehicle height to exceed the permissible legal limit. In such instances a modification of the blister in a manner to be discussed hereinafter may be necessary. In general, however, the auxiliary roof 19 will be spaced apart from the normal roof 10 by an extremely small distance, the smaller the better, so as to avoid exceeding the maximum permissible overall height for the vehicle. It is conventional with most types of trailers and semi-trailers to utilize pneumatic brakes or fluid brakes and there is shown in Figure 2 of the drawings conventional hoses or conduits 18 for braking connections between the tractor 1 and the semi-trailer 2.

Figure 5:
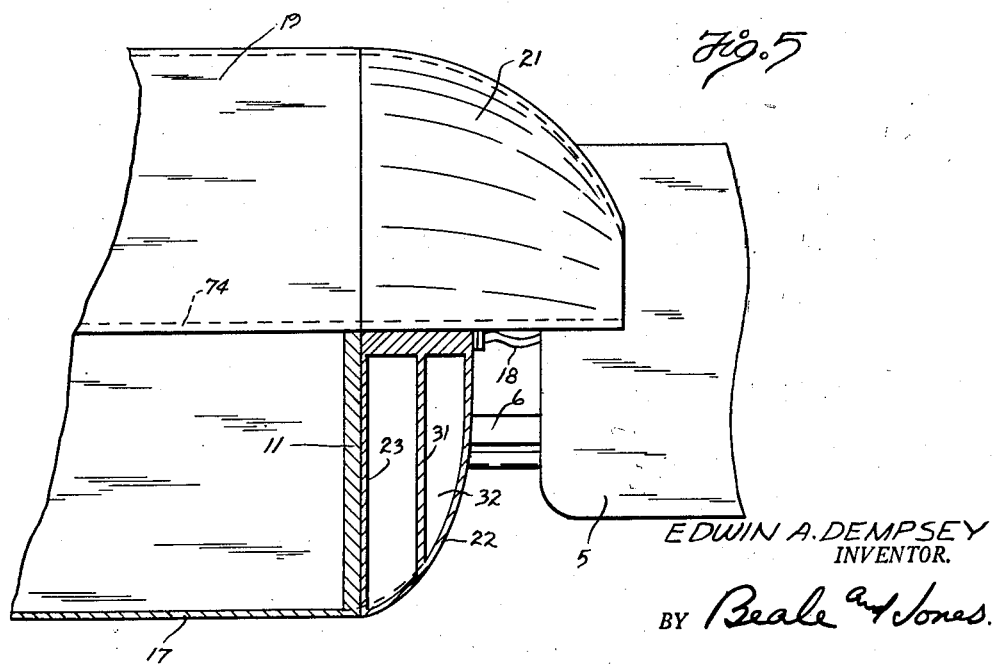
Figure 5 is a detailed top plan view, partly broken away and partly in cross-section, and as taken along the line 5—5 of Figure 4.

Turning now to the front end extension or chamber, which I have heretofore referred to as a "blister" for the sake of brevity, such a chamber is preferably basically formed in the shape of a truncated sphere with the truncated base superimposed over and immediately in front of the front wall 11 of the semi-trailer. While I have referred to the chamber or blister as a truncated sphere, it will be apparent that a truly spherical surface cannot be utilized without interfering with the cab structure of the tractor. Consequently, the chamber or blister is formed with an overhang or roof having a cut-away under portion which will accommodate the cab 4 of the tractor and provide clearance for all parts thereof, including the cab roof 5. Referring to Figures 3, 4, and 5, it will be observed that the chamber has a downwardly curved roof 21, an upwardly curved base 22, and a flat vertical rear wall 23 which is adapted to be placed flush against the front wall 11 of the semi-trailer. Some further departure from a truly spherical surface is necessary along side walls 24 and 25 in order to match the side walls of the blister 3 and make them co-extensive with side walls 12 of the semi-trailer. Walls 24 and 25 do curve inwardly from the marginal edges which are tangent to the vehicle side walls 17 at the extreme front edges thereof.

The blister roof 21 terminates in an edge 26. Beneath and roughly parallel to roof 21 is an interior compartment ceiling 27 which terminates in an edge 28 at a point below edge 26. Edges 26 and 28 form the upper and lower marginal edges of a port 29 and are preferably connected with curved ends so as to create an orifice which is uniform in shape. Port 29 communicates with a duct 30, formed by roof 21 and ceiling 27. Desirably duct 30 is divided into two subordinate ducts by a suitable partition wall 74. Ducts 30 communicate at their rearward ends with a pair of flattened ducts or channels 33 and 34 formed by and lying between the auxiliary roof 19 and the conventional roof 10 of the semi-trailer. A curved wall 31 extends from edge 28 downwardly and inwardly toward the base wall 23. The lowermost curved base 22 of the blister curves outwardly and upwardly and terminates at a point somewhat forward of curved wall 31 so as to create an air scoop or bucket 32 and one or more ducts 35, which extend downwardly and rearwardly until adjacent the point immediately below the foot of front wall 11 of the semi-trailer. Desirably a partition 76 will divide the duct 35 into a pair of ducts. These ducts 35 communicate with a pair of ducts 36 and 37 which are formed by and lie between the conventional floor 12 and the auxiliary floor 20 of the semi-trailer. Ducts 36 and 37 extend rearwardly from the front wall 11 of the semi-trailer to the rear end thereof. The bucket or scoop 32 desirably is divided medially by a partition member 75 large enough to accommodate coupling connections with pneumatic hose or hydraulic hose lines 18. However, partition 75 should be kept as small as possible so as to minimize obstructing or impeding the free flow of air into scoop 32 and ducts 35. At a plurality of points, along the auxiliary floor 20 in each of ducts 36 and 37, it will be desirable to provide water drainage ports 38. Where such ports are provided, I prefer to superimpose over each port a curved baffle or louvre 39.

The general purpose of port 29 and bucket 32 is to entrap and carry rearwardly, air which might otherwise cause excessive turbulence in the space between cab 4 and the blister 3. Since the scoop or bucket 32 has its forward inlet exposed, it is possible for rain, snow, or other moisture to enter the scoop and thence be conveyed into ducts 36 and 37. The purpose of the drainage ports 38 is to enable such moisture as may collect in ducts 36 and 37 to be discharged out of the ducts. Under some circumstances I have found it desirable to augment the flow of air entrapped and conveyed by bucket 32 and ducts 36 and 37 by means of an aspirator. One method of providing aspiration is illustrated in Figure 4 of the drawings wherein the exhaust pipe 8 from the tractor is modified by a Y fitting 40 to provide an alternative exhaust conduit 41 communicating with the normal exhaust line 8 and a second exhaust conduit 42 which communicates with an auxiliary conduit 44. The flow of exhaust gases through conduits 41 and 42 is controlled by a suitable valve 43. Conduit 44 terminates in a suitable coupling 45 which leads to an aspirating jet 46. Desirably conduit 42 may be branched to serve two conduits 44 each leading to a jet 46 in each of ducts 36 and 37.

I have designated as 47 the clearance between cab 4 of the tractor and the curved wall 31 of blister 3. Desirably the clearance space 47 will be large enough to permit free turning movement of the tractor (relative to the semi-trailer as modified by the blister) while at the same time providing for an air passageway for air drawn from around the marginal edges of the cab and from beneath the overhang of wall 31. It will thus be observed that the overall shape of the blister or chamber 3 and including its roof 21, its base 22, its front wall 31 is designed to provide a streamlined surface which will minimize turbulence, minimize overall air resistance at the front end of the semi-trailer and yet provide ports or traps for air funnelled into the space 47 and into port 29. The provision of the exterior curved surfaces placed outwardly and in front of the conventional flat front wall of the semi-trailer creates some useful space within the interior of the chamber 3. Such interior space may be utilized in a variety of manners. As illustrated in Figure 4 of the drawings there may be provided a suitable bunk upon which one member of the tractor-semi-trailer crew may rest or sleep while on the road. Such a bunk may be easily provided by means of a horizontal plate or shelf 49 suitably braced or supported by angles 50 and on which may be placed a suitable mattress or other bedding 51. In lieu of such a bunk the interior space in chamber 3 may be utilized for the installation of a suitable compressor system for example, where the semi-trailer is refrigerated and maintained at the desired temperature by a powered refrigerating system. Obviously the space may also be utilized for the storage of tools or for small packages thus increasing the load carrying capacity of the semi-trailer itself. Desirably to permit access to the interior of blister 3, a suitable door 53 may be provided. As illustrated in Figure 2, one door may be located on the outer or curb side of the semi-trailer but obviously doors could be placed on either or both sides. The doors may also be provided with windows which can be elevated or lowered so as to provide ventilation as when the space is utilized as a sleeping compartment.

As stated hereabove, the roof ducts 33 and 34 extend rearwardly to the rear-end of the semi-trailer. Similarly the floor ducts 36 and 37 extend to the rear-end of the semi-trailer. As shown in Figure 7, the roof ducts and floor ducts communicate with and terminate into spaces 56 and 57 formed between walls 52 and 52a of the auxiliary doors 14 and 15. Walls 52 and 52a are stiffened and joined by interior end walls 54 and exterior curved end walls 55. It will thus be seen that doors 14 and 15 are essentially hollow doors with the interior spaces 56 and 57 of each communicating with the roof ducts and floor ducts, respectively. To partition off space 56 from space 57, I provide a pair of curved baffles 59 and 58, the purpose of which will be more fully described hereinafter. These baffles are extended horizontally and completely across each of doors 14 and 15. The side edges of doors 14 and 15 curve rearwardly as shown at 55; similarly the top and bottom edges of doors 14 and 15 curve as shown at 60 and 63 so as to meet and form a tangential closure with the auxiliary roof at 61, and the auxiliary floor at 64. Desirably, I place within and roughly parallel to the upper curved edge 60 of the auxiliary doors, a curved baffle 62, and similarly with respect to the lower curved edge of each door, I place a curved baffle 65.

Opposite space 56 and across the exterior rear face 52 of each of doors 14 and 15, I provide a plurality of ports or openings 68 and 69. Similarly, opposite space 57 in each of doors 14 and 15, I provide a plurality of ports or openings 70 and 71. Within space 56 of each of the doors and between ports 68 and 69, I desirably provide a generally horizontal outwardly and upwardly curving baffle 66. Similarly in space 57 and between ports 70 and 71 I provide an inwardly and downwardly curving baffle 67. The area and proportions of the several ports 68, 69, 70, and 71 will be determined in a manner hereinafter described. However, the ports will be of reasonably extensive area and, of course, will be open to the outside elements. In the event of rain, snow, or other moisture, it is possible for some moisture to enter space 56. While in general, I prefer to place partition 59 fairly close to the bottom edge of ports 69, some material in exterior wall 52 should be left for strengthening purposes and where necessary to eliminate moisture which may collect in space 56, I may provide a plurality of drainage holes or ports 77 in wall 52. Moisture which may enter space 57 is free to descend into ducts 36 and 37 and may be discharged through the drainage ports 38.

It will be understood that certain modifications in the structure, herein disclosed by way of illustration, may be made without departing from the spirit of this invention. In general, it is contemplated that one of the essential elements of the invention is the provision of a blister or chamber adapted to be placed in front of the front wall of a semi-trailer so as to provide a streamlined surface which will diminish air resistance and the usual turbulence between the tractor cab and a semi-trailer front. A further feature of the invention is the provision of ports or air traps in the blister placed so as to entrap and collect air from the space 47 and convey the entrapped air to the rear of the vehicle. A still further feature of the invention is the discharge of the so entrapped and so conveyed air at a plurality of points fairly uniformly disposed in the auxiliary rear doors of the semi-trailer so as to discharge the air into the wake or space which in a moving vehicle is characterized by at least a partial vacuum. The underlying purposes of the features heretofore described are first to reduce the resistance in the front end of the semi-trailer and second to reduce the, at least partial, vacuum in the rear end of the semi-trailer thus minimizing the air resistance presented by a conventional semi-trailer. To accomplish the foregoing objectives certain precautions will be taken with regard to the dimensions of the air ducts 33 and 34 and 36 and 37, as well as to the feed ducts 30 and 35. Not only should the ducts 33, 34, 36, and 37 be so proportioned with regard to their cross-sectional areas as to accommodate the air entrapped by a port 29 and bucket 32 but the interior surfaces of the ducts and their connections to feed ducts 30 and 35 should be, by means of surfaces which are curved and streamlined, shaped so as to avoid turbulence and facilitate the unimpeded passage of air through the ducts. Similarly, at the discharge ends of the several ducts 33, 34, 36 and 37 the air discharged therefrom into the spaces 56 and 57 should be streamlined as much as possible so as to avoid turbulence and the baffles and partitions 58, 59, 67, and 66 should be curved and streamlined. It will be observed that baffles 62 and 65 are curved. It will also be observed that baffles 66 and 67 extend only partway into the interior of spaces 56 and 57, respectively. Thus, some of the air discharged from the roof ducts 33 and 34 will be discharged through ports 68, but part of such air will pass around baffles 66 and will be discharged through ports 69, respectively. The air discharged by the floor ducts will be similarly divided and passed through ports 70 and 71.

It will also be observed that port 29 is located above the roof 5 of the cab of the tractor and is thus exposed to the full force of any air flowing against the front of the semi-trailer. Because of this circumstance, port 29 is somewhat smaller in area than is the area of the bucket 32. Moreover, bucket 32 is considerably below the level of the roof 5 of the cab of the tractor and in a zone wherein considerable turbulence takes place in the conventional tractor-semitrailer combination. To insure the withdrawal of as much as possible of the air from the space 47 between wall 31 and the rear wall of the tractor cab not only is bucket 32 made as large as possible but in some cases it is found desirable to provide means for increasing the flow of air from the bucket through the feed duct 35 and through the floor ducts 36 and 37. The discharge of exhaust gases from the tractor in a manner to aspirate air as shown in Figure 4 is one means of augmenting the flow of air through the floor ducts. It will be understood, of course, that where the semi-trailer is refrigerated or is not in motion the discharge of exhaust gases into the floor ducts may be undesirable. Consequently, it is advantageous to provide some means for utilizing the exhaust gases at will and permitting their discharge through the conventional exhaust pipe whenever desired.

It will be understood by those skilled in the art that the blister or chamber which has been described above may be constructed at the time of construction of a semi-trailer and may be made integral with the front wall of the semi-trailer. However, it may also be added to semi-trailers which have previously been constructed and in use. As mentioned hereabove, only in the event that the conventional roof 10 of a given semi-trailer is so close to the legal maximum in heighth as to preclude the superimposed part of the auxiliary roof does the addition of the extension of blister 3 present any real problem. In such an event, it will be difficult to superimpose the auxiliary roof without violating legal limits and thus it will be difficult to provide space for the roof ducts. In such circumstances, it is within the spirit of my invention to interpose a spaced auxiliary wall between the trailer front wall 11 and the chamber rear wall 23, so as to accommodate ducts which would connect feed ducts 30 with the floor ducts 36 and 37. In such an event, it would also be desirable to modify the auxiliary doors 14 and 15 so as to eliminate the partitions 59 and 58 and replace such partitions with baffles such as 67. It will also be understood that the blister or chamber 3 may be constructed of a suitable metal framework covered with sheet metal or any solid plastic material, or it may be formed entirely of plastic, such plastics having come into commercial production in amounts which render their use feasible and economically possible.

From the foregoing, it will be observed that the invention heretofore described achieves a number of distinct advantages without modifying or lessening the payload capacity of the semi-trailer. The blister or chamber is installed in space which in the conventional semi-trailer is not utilized for any useful purpose. Moreover, the blister or extension having the streamlined surfaces greatly lessens the front end resistance of the semi-trailer and thus very materially reduces fuel consumption. These advantages as to fuel consumption and lessened wind resistance are further augmented by the provision for lessening the partial vacuum at the rear end of the semi-trailer thus further lessening the overall wind resistance and fuel losses. Moreover, not only does the blister or chamber serve its purpose without minimizing the maximum payload space of a semi-trailer, but it in fact provides useful space within the blister itself. Where the blister is used as a sleeping compartment, at least one member of the crew may acquire beneficial rest even while the semi-trailer is in motion on a long-distance haul. The lessening of fatigue resulting from such rest is an important safety factor in minimizing accidents and in eliminating stops otherwise necessary to enable the crew to rest. Apart from such safety factors, the minimizing, if not eliminating, turbulence and wind resistance at the front end of the semi-trailer avoids one source of serious accidents caused by swaying and whiplashing.

I claim:

1. A vehicle of the semi-trailer type comprising a load-carrying body having a roof, floor, side walls, front end wall and rear end access doors, a chamber disposed adjacent and in front of said front end wall, said chamber having a downwardly curving roof portion, an upwardly curving base portion, inwardly curving side portions and a rear wall which is co-extensive with the front end wall of said vehicle, an orifice adjacent said roof portion, said orifice communicating with a roof duct disposed within said chamber beneath said roof portion, a second orifice adjacent said base portion, said second orifice communicating with a floor duct disposed within said chamber above said base portion, said orifices and said ducts being adapted to entrap air and convey said entrapped air rearwardly.

2. A vehicle of the semi-trailer type comprising a load-carrying body having a roof, floor, side walls, front end wall and rear end access doors, a chamber disposed adjacent and in front of said front end wall, said chamber having a downwardly curving roof portion, an upwardly curving base portion, inwardly curving side portions and a rear wall which is co-extensive with the front end wall of said vehicle, an orifice adjacent said roof portion, said orifice communicating with a roof duct disposed within said chamber beneath said roof portion, a second orifice adjacent said base portion, said second orifice communicating with a floor duct disposed within said chamber above said base portion, said orifices and said ducts being adapted to entrap air and convey said entrapped air rearwardly, an auxiliary floor disposed beneath said vehicle body floor, body air ducts within the space between said body floor and said auxiliary floor, said body ducts communicating with said chamber floor duct.

3. A vehicle of the semi-trailer type comprising a load-carrying body having a roof, floor, side walls, front end wall and rear end access doors, a chamber disposed adjacent and in front of said front end wall, said chamber having a downwardly curving roof portion, an upwardly curving base portion, inwardly curving side portions and a rear wall which is co-extensive with the front end wall of said vehicle, an orifice adjacent said roof portion, said orifice communicating with a roof duct disposed within said chamber beneath said roof portion, a second orifice adjacent said base portion, said second orifice communicating with a floor duct disposed within said chamber above said base portion, said orifices and said ducts being adapted to entrap air and convey said entrapped air rearwardly, an auxiliary floor disposed beneath said vehicle body floor, body air ducts within the space between said body floor and said auxiliary floor, said body ducts communicating with said chamber floor duct, an auxiliary roof disposed above said vehicle body roof, body air ducts within the space between said body roof and said auxiliary roof, said body ducts communicating with said chamber roof duct.

4. A vehicle of the semi-trailer type comprising a load-carrying body having a roof, floor, side walls, front end wall and rear end access doors, a chamber disposed adjacent and in front of said front end wall, said chamber having a downwardly curving roof portion, an upwardly curving base portion, inwardly curving side portions and a rear wall which is co-extensive with the front end wall of said vehicle, an orifice adjacent said roof portion, said orifice communicating with a roof duct disposed within said chamber beneath said roof portion, a second orifice adjacent said base portion, said second orifice communicating with a floor duct disposed within said chamber above said base portion, said orifices and said ducts being adapted to entrap air and convey said entrapped air rearwardly, an auxiliary floor disposed beneath said vehicle body floor, body air ducts within the space between said body floor and said auxiliary floor, said body ducts communicating with said chamber floor duct, an auxiliary roof disposed above said vehicle body roof, body air ducts within the space between said body roof and said auxiliary roof, said body ducts communicating with said chamber roof duct, auxiliary doors disposed rearwardly of and co-extensive with said body rear end access doors, said auxiliary doors having air passages therein which communicate with said body roof and floor ducts and a plurality of air discharge ports disposed in the outer wall of said auxiliary doors.

5. A streamlined auxiliary chamber having useable space within the interior thereof and being adapted to be affixed to and in front of the outer front end wall of a vehicle of the semi-trailer type, said chamber having a downwardly curving roof portion, an upwardly curving base portion, inwardly curving side portions, and a vertical rear wall which is so dimensioned and shaped as to conform to and cover the front end wall of the vehicle when superimposed over and attached to said vehicle front end wall, a downwardly curving partition within said chamber, below said roof portion and substantially parallel thereto, forming with said roof portion an air duct the inlet end of which terminates in an air inlet orifice formed by the outer terminal edges of said roof portion and said partition.

6. A streamlined auxiliary chamber having useable space within the interior thereof and being adapted to be affixed to and in front of the outer front end wall of a vehicle of the semitrailer type, said chamber having a downwardly curving roof portion, an upwardly, outwardly curving front wall partition, an upwardly curving base portion, inwardly curving side portions, and a vertical rear wall which is so dimensioned and shaped as to cover the front end wall of the vehicle when superimposed over and attached to said vehicle front end wall, an upwardly curving partition within said chamber and above said base portion forming therewith an air duct the inlet end of which terminates in an orifice formed by the outer terminal edge of said base portion and the lower edge of said upwardly curving front wall partition.

EDWIN A. DEMPSEY.

REFERENCES CITED

The following references are of record in the file of this patent:

UNITED STATES PATENTS

| Number | Name | Date |
|---|---|---|
| 827,899 | Zimmerman | Aug. 7, 1906 |
| 926,971 | Ahrens | July 6, 1909 |
| 1,361,809 | Berry | Dec. 14, 1920 |
| 2,361,924 | Boynton | Nov. 7, 1944 |